US012769320B2

(12) United States Patent
Thomas et al.

(10) Patent No.: US 12,769,320 B2
(45) Date of Patent: Oct. 20, 2026

(54) UNMANNED ASSET CONTROL SYSTEM

(71) Applicant: Rockwell Collins France S.A.S., Blagnac Cedex (FR)

(72) Inventors: Eric Thomas, Pujaudran (FR); Elias Bitar, Tournefeuille (FR)

(73) Assignee: Rockwell Collins France S.A.S., Blagnac (FR)

( * ) Notice: Subject to any disclaimer, the term of this patent is extended or adjusted under 35 U.S.C. 154(b) by 74 days.

(21) Appl. No.: 18/794,241

(22) Filed: Aug. 5, 2024

(65) Prior Publication Data

US 2025/0068168 A1 Feb. 27, 2025

(30) Foreign Application Priority Data

Aug. 21, 2023 (EP) .................................... 23306401

(51) Int. Cl.
*G05D 1/223* (2024.01)
*G05D 1/224* (2024.01)
(Continued)

(52) U.S. Cl.
CPC ......... *G05D 1/2232* (2024.01); *G05D 1/2246* (2024.01); *G05D 1/646* (2024.01);
(Continued)

(58) Field of Classification Search
CPC .... G05D 1/2232; G05D 1/2246; G05D 1/646; G05D 1/69; G05D 2109/20;
(Continued)

(56) References Cited

U.S. PATENT DOCUMENTS 10,175,688 B2 * 1/2019 Shin ..................... G05D 1/0016
10,996,666 B2 5/2021 Li et al.
(Continued)

FOREIGN PATENT DOCUMENTS

| | | | | |
|---|---|---|---|---|
| CN | 115862629 A | 3/2023 | | |
| KR | 102557736 B1 | * | 7/2023 | B25J 13/06 |
| WO | WO-2022209398 A1 | * | 10/2022 | G08G 5/55 |

OTHER PUBLICATIONS

WO-2022209398 (Year: 2022).*
(Continued)

*Primary Examiner* — Kito R Robinson
*Assistant Examiner* — Zachary E. F. Glade
(74) *Attorney, Agent, or Firm* — Suiter Swantz IP

(57) ABSTRACT

A system for controlling operation of unmanned assets. The system includes a graphical user interface displaying a map. The graphical user interface accepts graphical inputs drawn on the map. The system also includes a calculation unit having an input interpretation module that recognizes the graphical inputs and translates the graphical inputs into tasks and/or commands. The calculation unit also includes an operation planning module that generates operation instructions based on the tasks and/or commands; and a journey planning module that generates a journey plan for the unmanned assets based on the operation instructions. The system also includes a communications module that communicates with the unmanned assets to instruct the unmanned assets to operate according to the generated journey plan.

13 Claims, 9 Drawing Sheets

(51) Int. Cl.

| | |
|---|---|
| ***G05D 1/646*** | (2024.01) |
| ***G05D 1/69*** | (2024.01) |
| ***G05D 105/28*** | (2024.01) |
| ***G05D 105/85*** | (2024.01) |
| ***G05D 107/10*** | (2024.01) |
| ***G05D 109/20*** | (2024.01) |
| ***G06F 3/04845*** | (2022.01) |
| ***G06F 3/04883*** | (2022.01) |
| ***G08G 5/32*** | (2025.01) |
| ***G08G 5/38*** | (2025.01) |

(52) U.S. Cl.

CPC ........... *G05D 1/69* (2024.01); *G06F 3/04845* (2013.01); *G06F 3/04883* (2013.01); *G08G 5/32* (2025.01); *G05D 2105/285* (2024.01); *G05D 2105/85* (2024.01); *G05D 2107/10* (2024.01); *G05D 2109/20* (2024.01); *G08G 5/38* (2025.01)

(58) Field of Classification Search

CPC ......... G05D 2105/285; G05D 2105/85; G05D 2107/10; G08G 5/32; G08G 5/38; G06F 3/04845; G06F 3/04883

See application file for complete search history.

(56) References Cited

U.S. PATENT DOCUMENTS

| | | | | |
|---|---|---|---|---|
| 11,429,220 | B2 * | 8/2022 | Park | G06F 3/04883 |
| 11,545,040 | B2 | 1/2023 | Kleveland et al. | |
| 2010/0286859 | A1 * | 11/2010 | Feigh | G08G 5/55 701/25 |
| 2011/0283285 | A1 * | 11/2011 | Saad | G06Q 10/103 719/330 |
| 2017/0061803 | A1 | 3/2017 | Sugaya | |
| 2017/0212523 | A1 * | 7/2017 | Witelson | E04H 4/1654 |
| 2017/0242432 | A1 * | 8/2017 | Raz | H04N 7/185 |
| 2019/0290374 | A1 * | 9/2019 | Ramadorai | A61B 34/30 |
| 2020/0042169 | A1 * | 2/2020 | Croston | G06F 3/04845 |
| 2021/0397202 | A1 | 12/2021 | Böckem et al. | |
| 2022/0324562 | A1 | 10/2022 | Kleveland et al. | |
| 2022/0334588 | A1 * | 10/2022 | Oda | G05D 1/0297 |

OTHER PUBLICATIONS

KR-102557736-B1 (Year: 2023).*

European Patent Office, Extended European Search Report received in EP Application No. 23306401.3, Jan. 23, 2024, 10 pages.

* cited by examiner

UNMANNED ASSET CONTROL SYSTEM

CROSS-REFERENCE TO RELATED APPLICATION

This nonprovisional application claims the benefit of priority of EP23306401.3 filed Aug. 21, 2023, which is hereby incorporated by reference in its entirety.

TECHNICAL FIELD

This disclosure relates to systems and methods for controlling operation of one or more unmanned assets.

BACKGROUND

At present, unmanned assets, in particular unmanned aerial vehicles (UAVs), are commanded via the input of a specifically designated journey, or journey plan. This requires an unmanned asset commander to calculate a journey plan for each unmanned asset and manually instruct this plan. In the case of UAVs, the journey plan is a flight plan and the calculated flight plan must contain specific instructions, e.g. take off and climb to altitude X, follow heading Y for Z km, then turn onto heading A, etc. This is a very involved task for the commander.

Many modern operations are performed using a combination of manned and unmanned assets, and as such, it is advantageous for the crew of manned assets to be able to allocate tasks to unmanned teammates. Current systems require too much detailed input from commanders to be operated effectively by crew who must also focus on the operation of their own manned asset (e.g. a pilot must focus on flying his own aircraft and does not have the time to plot out and instruct detailed flight plans for each of his unmanned teammates). As such, a more efficient system for controlling unmanned assets, in particular UAVs, is needed.

BRIEF SUMMARY

According to this disclosure, there is provided a system for controlling operation of one or more unmanned assets, the system comprising:

- a graphical user interface displaying a map, wherein the graphical user interface is configured to accept one or more graphical inputs which are drawn on the map by an unmanned asset commander;
- a calculation unit comprising:
  - an input interpretation module configured to:
    - recognize the graphical inputs; and
    - translate the graphical inputs into tasks and/or commands;
  - an operation planning module configured to:
    - generate operation instructions for one of more of the unmanned assets based at least on the tasks and/or commands; and
  - a journey planning module configured to:
    - generate a journey plan for one or more of the unmanned assets based at least on the operation instructions; and
- a communications module configured to communicate with the one or more unmanned assets to instruct the unmanned assets to operate according to the generated journey plan.

According to this disclosure, there is also provided a method for controlling operation of one or more unmanned assets, the method comprising:

- displaying a map on a graphical user interface;
- accepting, via the graphical user interface, one or more graphical inputs which are drawn on the map by an unmanned asset commander;
  - recognising the graphical inputs;
  - translating the graphical inputs into tasks and/or commands;
  - generating operation instructions for one or more of the unmanned assets based at least on the tasks and/or commands;
  - generating a journey plan for one or more of the unmanned assets based at least on the operation instructions; and
  - communicating with the one or more unmanned assets to instruct the unmanned assets to operate according to the generated journey plan.

It will be understood that the tasks and/or commands are what the commander has instructed via their graphical inputs (e.g. take off from this location, deliver payload to this location, patrol/scan this area), however, the tasks and/or commands are in the form of an unordered list, and may not be allocated to any specific unmanned asset.

It will be understood that the operation instructions are (e.g. high-level) instructions which are specific to an individual unmanned asset (e.g. unmanned asset x is to take off from this location, then patrol this area, then deliver payload at this location etc). In examples, they result from the sequencing and allocation of the tasks and/or commands (e.g. unordered and unallocated list of tasks and/or commands) discussed above to the one or more unmanned assets. It will therefore be understood that, in examples, where the operation of a plurality of assets is being controlled, separate operation instructions will be generated for each of the plurality of assets.

It will further be understood that the journey plan is a more detailed plan (e.g. take off from this location, climb to altitude x, follow heading Y for Z km to reach the area to be patrolled, patrol the area at an altitude X whilst flying in a zig-zag pattern for T minutes, etc.) which is specific to an individual unmanned asset and is generated to be executed by each individually designated unmanned asset. It will therefore be understood that where the operation of a plurality of assets is being controlled, a separate journey plan will be generated for each of the plurality of assets.

As such, the method may comprise (and the operation planning module may be configured to) generating operation instructions for each of the one or more unmanned assets based at least on the tasks and/or commands.

As such, the method may comprise (and the journey planning module may be configured to) generating a journey plan for each of the one or more unmanned assets based at least on the operation instructions. Thus, the method may comprise (and the communications module may be configured to) communicating with the one or more unmanned assets to instruct the unmanned assets to operate according to the respective generated journey plans (i.e. the journey plan for each unmanned asset).

This journey plan may result from the refinement of the sequence of the operation instructions. The generation of the journey plan may also comprise translating the operation instructions into a format which the unmanned assets understand.

In examples, where not all of a plurality of assets are assigned tasks, the one or more assets which have not been assigned tasks may not have a journey plan communicated to them. Alternatively, the assets may have a journey plan communicated to them which instructs the assets to do nothing, or to hold position.

The communication between the communications module and the one or more unmanned assets may occur via a communications module on board each of the one or more unmanned assets.

In examples, the communications module is configured to communicate with the one or more unmanned assets to monitor the execution of the unmanned asset's instructed journey plan.

In some examples, the operation planning module is further configured to obtain data indicative of external and/or environmental constraints, and to generate operation instructions based on the data indicative of external and/or environmental constraints.

In some examples, the data indicative of external and/or environmental constraints comprises data indicative of one or more of: terrain information (e.g. elevation, gradient, surface type), weather, obstacles, air traffic, restricted and hazardous areas, published navigation information (e.g. routes, corridors, aerodromes, etc.).

In some examples, the graphical user interface is configured to accept hand-drawn inputs. In some examples, the graphical user interface comprises a touchscreen. In some examples, the graphical user interface may comprise a different device, for example, a projector, a hologram, cameras, a drawing tablet, a gesture recognition device, a non-touchscreen device requiring inputs using a conventional mouse.

In some examples, the system and method are for controlling operation of one or more unmanned assets including one or more unmanned aerial vehicles (UAVs). In some examples, the system and method are for controlling operation of one or more UAVs.

In some examples, the system and method are for controlling operation of a plurality of unmanned assets comprising a plurality of different unmanned asset types, e.g. unmanned aerial vehicles (UAVs), unmanned ground vehicles (UGVs), unmanned surface vehicles (USVs) for operation on the surface of water, unmanned underwater vehicles (UUVs).

In some examples, recognising the graphical inputs comprises (and the input interpretation module is configured to (recognize the graphical inputs by)) identifying the shapes of the graphical inputs, and further identifying geographical locations corresponding to the portions of the map on which the graphical inputs were drawn.

In some examples translating the graphical inputs comprises (and the input interpretation module is configured to (translate the graphical inputs by)) comparing the graphical inputs to a library of known input symbols and their corresponding commands.

In some examples, the input interpretation module comprises a (e.g. local) memory, wherein the library of known input symbols and corresponding commands is stored in the (e.g. local) memory.

In some examples, the library of known input symbols and corresponding commands is stored in a remote memory. In some examples, translating the graphical inputs comprises (and the input interpretation module is configured to) obtaining the library of known input symbols and corresponding commands from the (e.g. remote) memory.

In some examples, the method comprises (and the input interpretation module is configured to) producing an error output if the graphical input does not match any of the known input symbols.

In some examples, the method comprises (and the graphical user interface is configured to) providing an indication of the error to the user (e.g. via a message on a screen, or, in examples where the graphical user interface comprises an audio function, via an audible error message sound).

In some examples, the method comprises (and the operation planning module is configured to) receiving (e.g. via the communication module) position and/or status data relating to the one or more unmanned assets.

In examples, the unmanned asset status data may comprise one or more of availability, health status, charge/fuel level, and/or payload status relating to the one or more unmanned assets.

In some examples, the method comprises (and the operation planning module is configured to) receiving (e.g. via the communication module) position and status data from each unmanned asset (e.g. from a communication module of each unmanned asset).

In some examples, the method comprises (and the operation planning module is configured to) receiving (e.g. via the communication module) position and status data from an unmanned asset tracking database which contains the current position and status of one or more (e.g. all) unmanned assets in a fleet. The information in the unmanned asset tracking database may come from the unmanned assets themselves, or the position of unmanned assets may be determined using a system external from the unmanned assets, e.g. a GPS or RADAR tracking system. In another example, the information in the unmanned asset tracking database may come from logs. For example, it may be determined, from a usage log, that a fleet of unmanned assets are currently available for use and being stored at a base or in a hangar.

In some examples, the method comprises (and the operation planning module is configured to) allocating tasks associated with graphical inputs to different ones of a plurality of unmanned assets. In some examples, where the plurality of assets comprises a plurality of different asset types, the method may comprise (and the operation planning module may be configured to) obtaining data indicative of the capabilities of each asset, and allocating tasks based at least partially on the data indicative of the capabilities of each asset.

In some examples, the allocation of tasks is based at least partially on the position and/or status data.

In some examples, a single graphical input may be applicable to a plurality (e.g. the entire fleet or a cluster or group) of unmanned assets. As such, in some examples, the method comprises (and the operation planning module is configured to) allocating a single task or command to a plurality (e.g. the entire fleet or a cluster or group) of unmanned assets.

In some examples, the graphical inputs correspond to commands including one or more of: take off from this location, land in this location, ditch in this location in case of emergency, rendezvous at this location at this time, deliver payload to this location, pick up payload from this location, inspect (one time) this portion of highway/border/railway/powerline, patrol (several times) this portion of highway/border/railway/powerline from this location, inspect (one time) this portion of highway/border/railway/powerline, patrol/scan this area, avoid flying over this area, loiter in this location, monitor this point of interest in orbit, monitor this point of interest in a figure of eight, search this area for targets, search along this border for targets, gather at this location, split from this location.

According to this disclosure, there is also provided a system comprising one or more unmanned assets; and a system for controlling operation of the one or more unmanned assets as described herein.

In some examples, the one or more unmanned assets comprise a communications module configured to communicate with the communications module of the system for controlling operation of the one or more unmanned assets.

In some examples, the one or more unmanned assets include one or more unmanned aerial vehicles (UAVs).

In some examples, the system comprises a plurality of unmanned assets comprising a plurality of different unmanned asset types, e.g. unmanned aerial vehicles (UAVs), unmanned ground vehicles (UGVs), unmanned surface vehicles (USVs) for operation on the surface of water, unmanned underwater vehicles (UUVs).

In some examples, the one or more unmanned assets are configured to send position and/or status data (e.g. via a communication module of each unmanned assert) relating to the one or more unmanned assets to the system for controlling operation of the one or more unmanned assets.

In examples, the unmanned asset status data may comprise one or more of availability, health status, charge/fuel level, and/or payload status.

In some examples, the one or more unmanned assets are configured to send data indicative of their capabilities (e.g. land capabilities, aquatic capabilities, aerial capabilities, payload capabilities, monitoring capabilities, etc.).

BRIEF DESCRIPTION OF DRAWINGS

One or more non-limiting examples will now be described, by way of example only, and with reference to the accompanying figures in which.

DETAILED DESCRIPTION

The below described examples will be understood to be exemplary only. It will be understood that where used herein, terms such as up and down refer to directions as viewed in the reference frame of the appended Figures.

Figure 1:
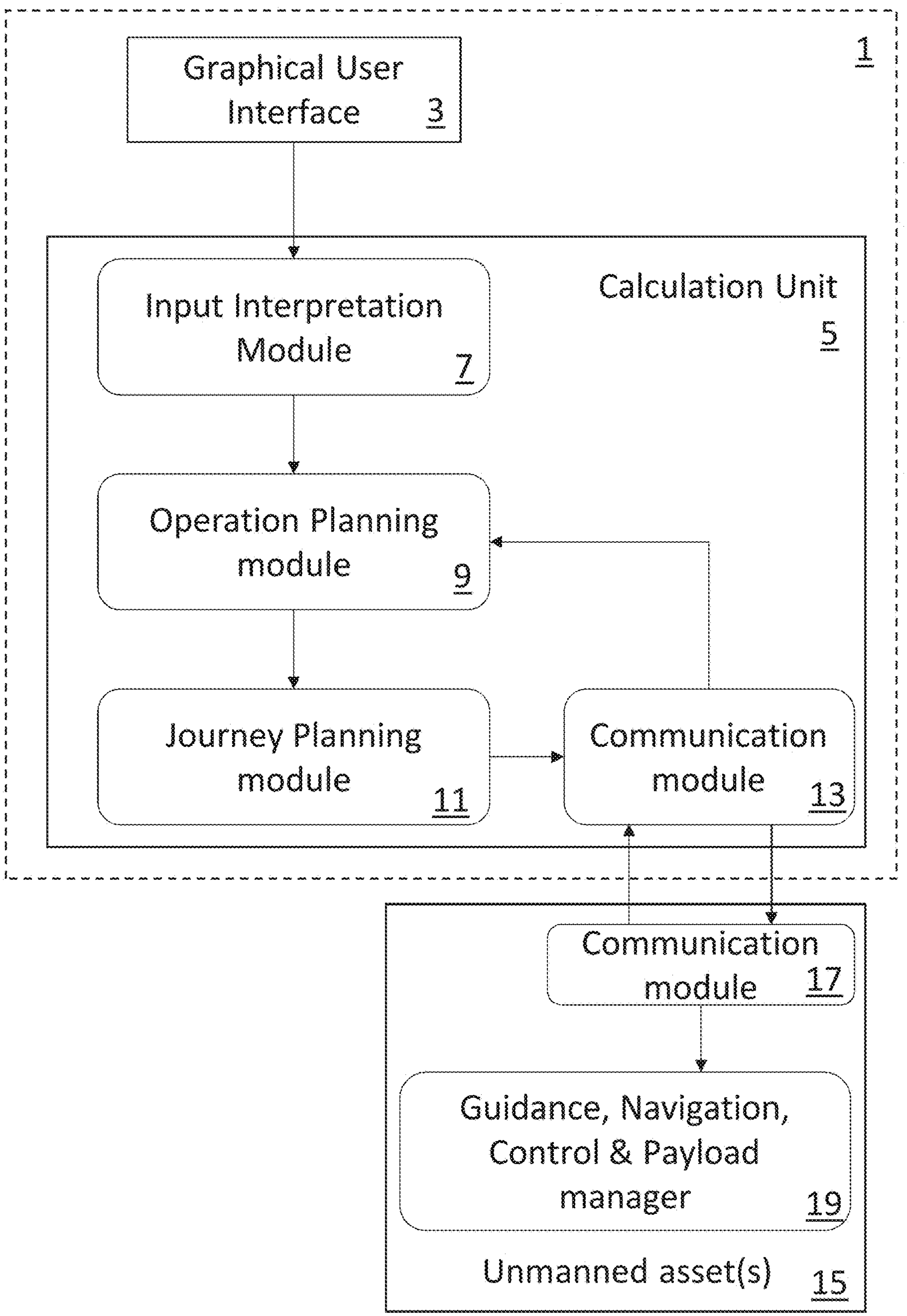
FIG. 1 is a schematic block diagram showing a system 1 for controlling one or more unmanned assets.

FIG. 1 is a schematic block diagram showing a system 1 for controlling the operation of one or more unmanned assets 15. The system includes a graphical user interface 3 which, in the illustrated example, is a touchscreen. The system further includes a calculation unit 5 which comprises an input interpretation module 7, an operation planning module 9, a journey planning module 11, and a communication module 13.

In FIG. 1, the system 1 is shown in communication with one or more unmanned asset(s) 15. The unmanned asset(s) each comprises a communication module 17, and a guidance, navigation, control and payload manager 19.

Operation of the system 1 will now be explained with reference to the flowchart of FIG. 2.

Figure 2:
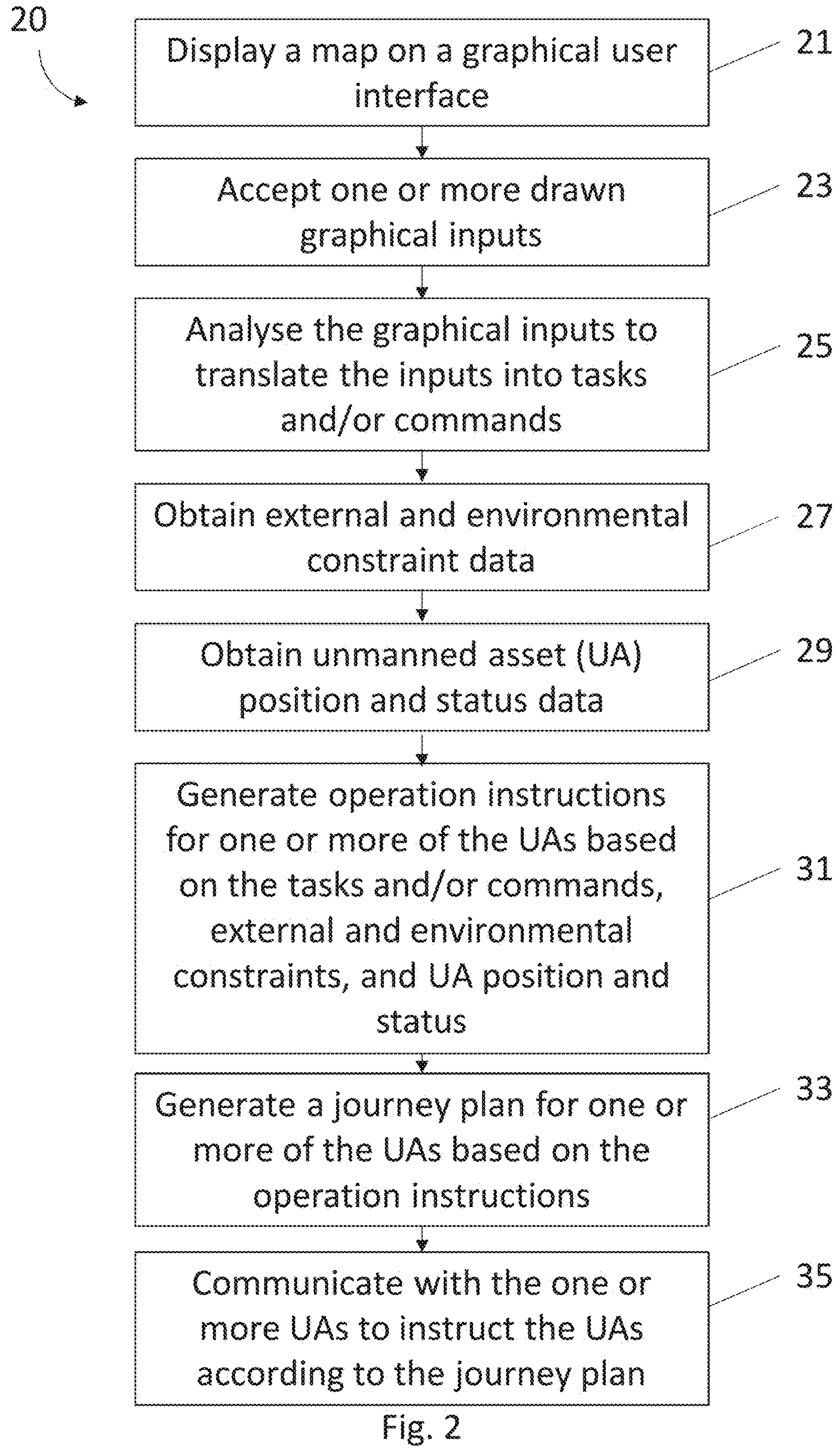
FIG. 2 is a flowchart illustrating a method for controlling one or more unmanned assets.

FIG. 2 shows a flowchart illustrating the method 20 which is performed by the system 1 of FIG. 1. At step 21, an illustration of a map is displayed on a graphical user interface 3. The displayed map corresponds to a geographical area in which the one or more unmanned assets 15 will be conducting a mission. The area to be displayed on the graphical user interface 3 may be selected by a commander as a pre-condition of the method 20. Alternatively, the graphical user interface 3 may display a map centred around the commander's current location or centred around the current location of an unmanned asset or cluster of unmanned assets 15.

At step 23, the graphical user interface 3 accepts one or more illustrated inputs from the commander. In the illustrated example, the graphical user interface 3 is a touchscreen and so the commander provides their graphical inputs by drawing on the touchscreen with a finger or a stylus. In some examples, step 23 may also comprise accepting a further input from the commander confirming that they have finished providing graphical inputs, and the system 1 should proceed to analysing the graphical inputs.

At step 25, the input interpretation module 7 analyses the graphical inputs, and translates the graphical inputs into tasks and/or commands. This analysis comprises three steps:

a) recognize the shape which has been drawn;

b) determine the location or locations which correspond to the position on the map at which the graphical input has been drawn;

c) compare the recognized shape to a library of known shapes and, if the shape matches a known shape, output the task and/or command which is associated with that shape to be performed at the location or locations which were determined at step (b).

It will be understood that, in examples, the order of steps (b) and (c) may be reversed.

In examples, the input interpretation module 7 may be configured to output an error message, for example to be displayed to a commander (e.g. using the graphical user interface) if at step (a) the shape is not recognized, or at step (c) the recognized shape does not match a known shape.

The shape recognition from step (a) can use any known shape recognition tool, for example, Adobe's® shaper tool. Example shapes, and their associated tasks and/or commands, are discussed below in relation to FIGS. 3*a*-8*b*, 10*a* and 10*b*.

It will be understood that the recognition step (a) comprises recognising the shape which has been drawn, without yet processing its significance, e.g. recognising that the commander has drawn a circle with a cross through it. It is at step (c) that the significance of this shape is determined. There may be scenarios where a shape is recognized at step (a) by the shape recognition tool, but the shape does not correspond to a known shape which has an associated task or command. For example, if the commander drew an octagon, the shape recognition tool may recognize (at step (a)) that an octagon had been drawn, but at step (c) no task and/or command is found which is associated with an octagon, and so an error message may be output at step (c).

The tasks and/or commands are then forwarded by the input interpretation module 7 to the operation planning module 9.

At step 27, external and environmental constraint data is obtained by the operation planning module 9. This data may comprise a plurality of different data types which may be relevant. In some examples, the external and environmental constraint data comprises terrain elevation data, weather data, obstacle data, and air traffic data. This data can be obtained in any suitable and desired way, for example via a ground network and/or via wireless communications. In some examples, the terrain elevation data may be stored in local memory.

At step 29, unmanned asset position and status data is obtained. The communication module 17 of each unmanned asset is configured to send position and status data to the communication module 13 of the control system 1. This data is then forwarded by the system's communication module 13 to the operation planning module 9. The unmanned asset status data may comprise details such as availability, health status, charge/fuel level, payload status, etc.

Obtaining unmanned asset position and status data may be performed by means other than the communication module 17 of each asset. For example, the system may be configured to interface with an unmanned asset tracking database which contains the current position and status of all unmanned assets in a fleet. The information in the unmanned asset tracking database may come from the unmanned assets themselves, or the position of unmanned assets may be determined using a system external from the unmanned assets, e.g. a GPS or RADAR tracking system. In another example, the information in the unmanned asset tracking database may come from logs. For example, it may be determined, from a usage log, that a fleet of unmanned assets are currently available for use and being stored at a base or in a hangar.

At step 31, the operation planning module 9 generates operation instructions based on the tasks and/or commands, the external and environmental constraint data, and the unmanned asset position and status data. The operation instructions may be considered macro-operations which outline a mission strategy, and a sequence of operations to be performed by the one or more unmanned assets 15. The operation planning module is configured to sequence and allocate (e.g. optimally sequence and allocate) the tasks and/or commands to the one or more unmanned assets. As such it may not be necessary for the commander to sketch the mission in the exact order the operations will be executed. The commander may start from the main objective (e.g. "search that area"), and then define where to take-off from, where to land, no-fly zones, emergency landing zones, etc. As such, once step 31 is complete, a set of operation instructions has been generated for each of the unmanned assets which has been allocated any tasks and/or commands At step 33, the operation instructions are passed to the journey planning module 11. The journey planning module 11 uses the macro-operations outlined by the operation instructions to generate specific journey plans for one or more of the individual unmanned assets 15. These journey plans include all sufficient detail for a commander to carry out its assigned mission, e.g. take off location, exact route, altitude and groundspeed instructions, and payload commands.

At step 35, the communication module 13 sends the respective journey plans to the one or more unmanned assets 15 via the communications modules 17 of the unmanned assets 15. The guidance, navigation, control, and payload manager 19 of the or each unmanned asset 15 can then operate the unmanned asset 15 to follow the assigned journey plan.

The method 20 will now be explained in relation to an example.

At step 21, a map is displayed on a graphical user interface, and at step 23, the unmanned asset commander draws graphical inputs corresponding to tasks. At step 25, the inputs are analysed, and translated into a list of tasks and commands:

patrol this area
deliver a payload at this location,
take off from this location
land at this location.

At step 27 and 29 external and environmental constraint data, and unmanned asset position and status data are obtained.

At step 31, operation instructions are generated based on the list of tasks and commands, the external and environmental constraint data, and the unmanned asset position and status data. The operation instructions are specific to each unmanned asset and result from the sequencing and allocation of the tasks and/or commands. In this example, the unmanned asset position and status data indicates that there are two unmanned assets, A and B available at the instructed take-off location, and that unmanned asset A has surveillance capabilities and unmanned asset B has payload capabilities. As such, the operation instructions are as follows:

Asset A operation instructions:

1. take off from the specified location
2. patrol the specified area
3. land at the specified landing location Asset B operation instructions:

1. take off from the specified location
2. deliver the payload at the specified delivery location
3. land at the specified landing location At step 33, a journey plan is generated for unmanned asset A and unmanned asset B, based on their respective operation instructions. The journey plan contains detailed instructions for the journey in a format which the assets understand. As such, the journey plan instructions are as follows:

Asset A journey plan:

1. take off from the specified location
2. climb to an altitude of 500 m
3. fly on heading 40 degrees for 10 km
4. fly in a zig-zag pattern over these coordinates at an altitude of 500 m for 30 minutes
5. fly on heading 160 degrees for 15 km
6. land at the specified landing location Asset B journey plan:

1. take off from the specified location
2. climb to an altitude of 300 m
3. fly on heading 160 degrees for 15 km
4. descend to an altitude of 100 m and drop the payload at these coordinates
5. fly on heading 400 degrees for 10 km
6. land at the specified landing location At step 35, assets A and B are sent their journey plans.

FIGS. 3*a* to 8*b*, and 10*a* and 10*b* illustrate a graphical vocabulary which may be used by the system 1 of the illustrated example. It will be understood that the vocabulary described herein is purely exemplary, and that any suitable vocabulary could be defined.

Figure 3A:
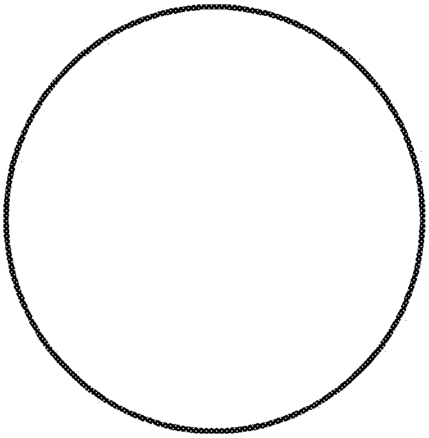
FIGS. 3*a-d*, 4*a-d*, 5*a-b*, 6*a-d*, 7*a-c*, and 8*a-b* illustrate a plurality of symbols which may be accepted as graphical inputs.
Figure 3B:
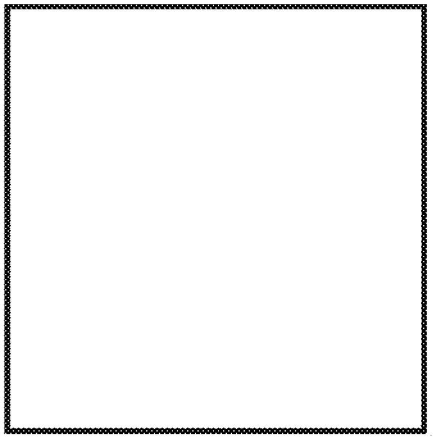
Figure 3C:
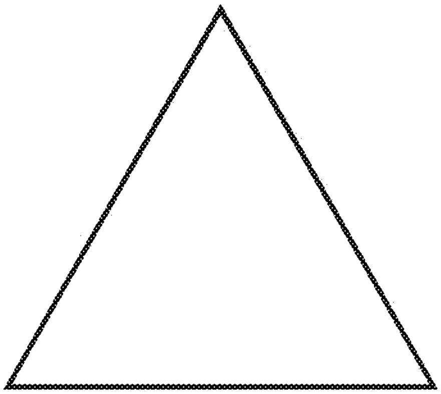
Figure 3D:
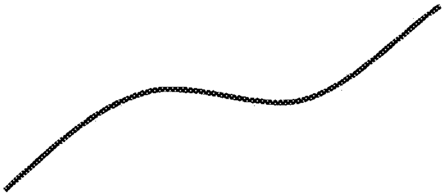

FIGS. 3*a-d* illustrate symbols which are used for different operations categories. FIG. 3*a* is a circle, which is used for instructing journey operations, FIG. 3*b* is a square, which is used for instructing payload/cargo operations, FIG. 3*c* is a triangle, which is used for interruptible operations, and FIG. 3*d* shows a line, which is used for instructing zone-based operations.

FIGS. 4*a-d* illustrate symbols which are used for instructing various journey operations. As explained in relation to FIG. 3*a*, and as can be seen from FIGS. 4*a-d*, each of the symbols are based on a circle.

Figure 4A:
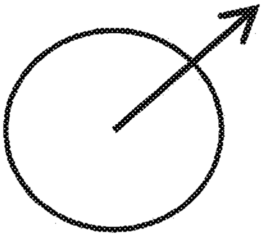

FIG. 4*a* shows a circle with a straight arrow originating from the centre of the circle and pointing diagonally upwards, out of the circle. This symbol is used when the commander wishes to instruct an unmanned asset to take off from the position which is circled on the map.

Figure 4B:
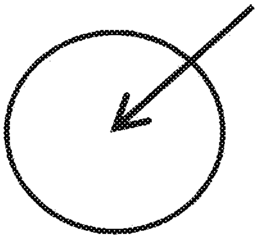

FIG. 4*b* shows a circle with a straight arrow originating from outside the circle and pointing diagonally downwards, to the centre of the circle. This symbol is used when the commander wishes to instruct an unmanned asset to land at the position which is circled on the map.

Figure 4C:
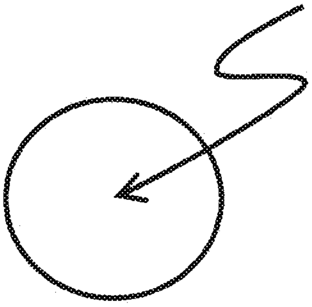

FIG. 4*c* shows a circle with a zig-zag arrow originating from outside the circle and pointing to the centre of the circle. This symbol is used when the commander wishes to instruct an unmanned asset to land (e.g. emergency land or ditch) at the position which is circled on the map in the case of an emergency.

Figure 4D:
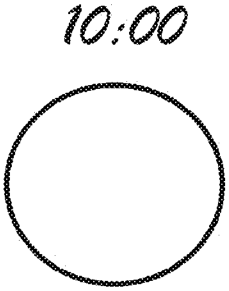

FIG. 4*d* shows a circle with a time written next to it. This symbol is used when the commander wishes to instruct an unmanned asset to rendezvous at the position which is circled on the map at the written time.

Figure 5A:
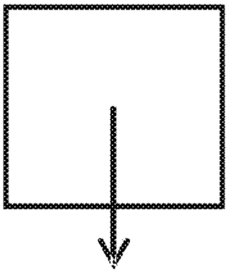
Figure 5B:
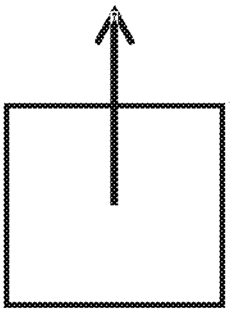

FIGS. 5*a* and 5*b* show two symbols which are used to instruct payload/cargo operations. As explained above in relation to FIG. 3*b*, both of these symbols are based on squares. FIG. 5*a* shows a square with a straight arrow originating from the centre of the square and pointing downwards out of the square. This symbol is used to instruct an unmanned asset 15 to deposit its payload/cargo at the location on the map which is covered by the square. FIG. 5*b* shows a square with a straight arrow originating from the centre of the square and pointing upwards out of the square. This symbol is used to instruct an unmanned asset 15 to collect its payload/cargo from the location on the map which is covered by the square.

Figure 6A:
Figure 6B:

FIG. 6*a* shows a symbol which comprises a line having a circle at one end, and an arrowhead at the opposite end. This symbol is used to instruct an unmanned asset 15 to inspect the feature covered by the line once, travelling in the direction of the arrowhead. This symbol may be drawn for example over a section of highway, border, railway line, powerline. FIG. 6*b* shows a similar symbol, but rather than having a circle at one end, the line has arrowheads at both ends. This symbol is used to instruct the unmanned asset 15 to patrol the feature covered by the line (e.g. inspect several times).

Figure 6C:
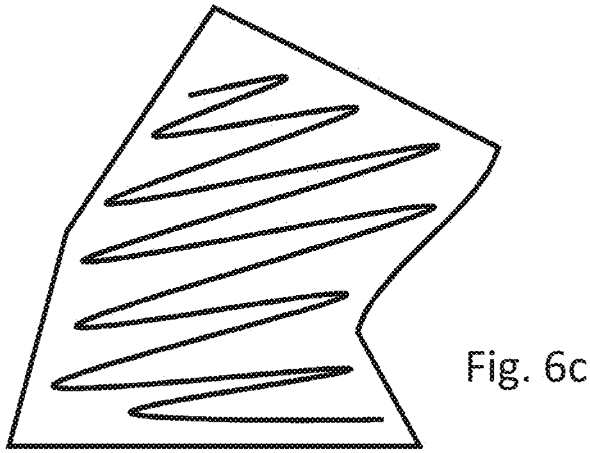

FIG. 6*c* shows a representation which is used to instruct an unmanned asset 15 to patrol an area. The specific shape shown in FIG. 6*c* is purely exemplary. To instruct an unmanned asset to patrol an area, the commander draws an enclosed shape (e.g. polygon) around that area, and then draws a zig-zag line inside that shape.

Figure 6D:
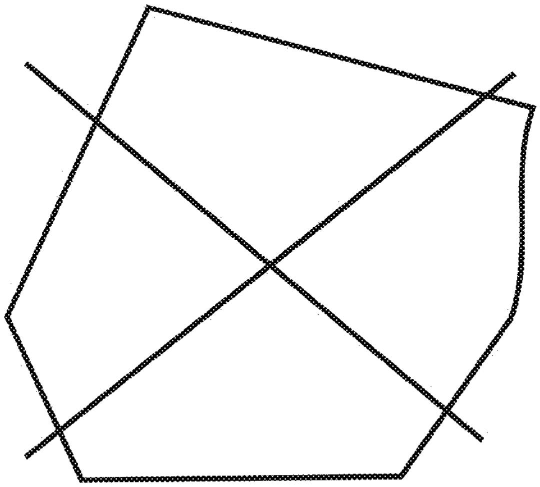

FIG. 6*d* shows a representation which is used to instruct an unmanned asset 15 to avoid an area (e.g. avoid flying over an area). As with FIG. 6*c*, the specific shape shown in FIG. 6*d* is purely exemplary. To instruct an unmanned asset 15 to avoid an area, the commander draws an enclosed shape (e.g. polygon) around that area, and then draws a cross through that shape.

Use of the drawings shown in FIGS. 6*a-d* may be better understood with reference to FIG. 9 which is discussed below.

FIGS. 7*a-c* and FIGS. 8*a-b* show symbols which are used to instruct interruptible operations. As explained above in relation to FIG. 3*c*, each of these symbols involves a triangle. In the illustrated example, there are two classifications of interruptible operations, those interruptible by the commander, and those interruptible by the unmanned asset 15.

An operation may be interrupted by an unmanned asset 15 for example in a search and rescue mission where the instruction is to scan a certain area until the missing person is located. Upon locating the person, the unmanned asset 15 would then interrupt its own scanning operation. In the defined vocabulary, commander interruptible operations are denoted by an upwardly pointing triangle whilst unmanned asset 15 interruptible operations are denoted by a downwardly pointing triangle.

Figure 7A:
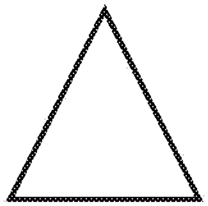

The symbol shown in FIG. 7*a* is a simple upwardly pointing triangle. This symbol is used to instruct an unmanned asset 15 to loiter/hover at the position at which the triangle is drawn on the map. Since this is an upwardly pointing triangle, the instruction is to loiter/hover until interrupted by the commander.

Figure 7B:
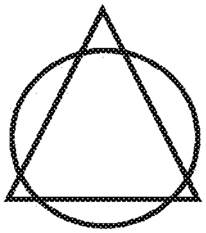

The symbol shown in FIG. 7*b* is an upwardly pointing triangle with a circle overlaid. This symbol is used to instruct an unmanned asset 15 to monitor a point of interest at the position at which the symbol is drawn on the map whilst flying in orbit around the point of interest. Since this is an upwardly pointing triangle, the instruction is to monitor the point of interest in orbit until interrupted by the commander.

Figure 7C:
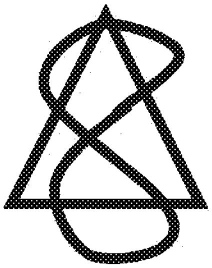

The symbol shown in FIG. 7*c* is an upwardly pointing triangle with a figure of eight overlaid. This symbol is used to instruct an unmanned asset 15 to monitor a point of interest at the position at which the symbol is drawn on the map whilst flying in a figure of eight around the point of interest. Since this is an upwardly pointing triangle, the instruction is to monitor the point of interest in a figure of eight until interrupted by the commander.

It will be understood that for operations to be interrupted by the commander, the system may provide functionality for the commander to provide dynamic instructions such that the calculation unit 5 can make alterations to the journey plan of an unmanned asset 15 even after the asset has been deployed.

Figure 8A:
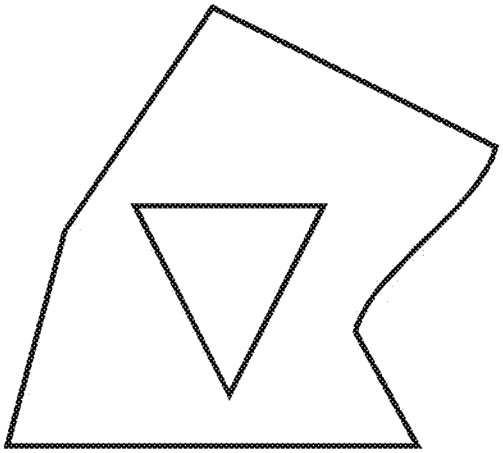

FIG. 8*a* shows a modification of the representation shown in FIG. 6*c*. The representation shown in FIG. 8*a* is a polygon which is drawn over an area of the map, and a downwardly pointing triangle is drawn inside this area. This is used to instruct an unmanned asset 15 to search an area (e.g. for a lost person) continually, but for the unmanned asset 15 to interrupt that operation, for example if the lost person is found by the unmanned asset 15.

Figure 8B:
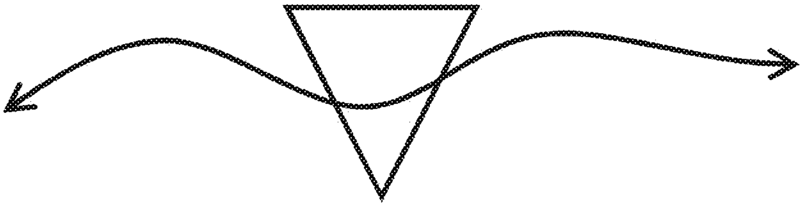

FIG. 8*b* shows a modification of the representation of FIG. 6*b*. The representation shown in FIG. 8*b* is the double ended arrow from FIG. 6*b* which is used to instruct the scanning/patrolling of the feature covered by the line, but in FIG. 8*b*, a downwardly pointing triangle is drawn over the line. As discussed above in relation to FIG. 8*a*, this is used to instruct the unmanned asset 15 to search the feature (e.g. for an intrusion) continually, but for the unmanned asset 15 to interrupt that operation, for example if the lost person is found by the unmanned asset 15.

Figure 9:
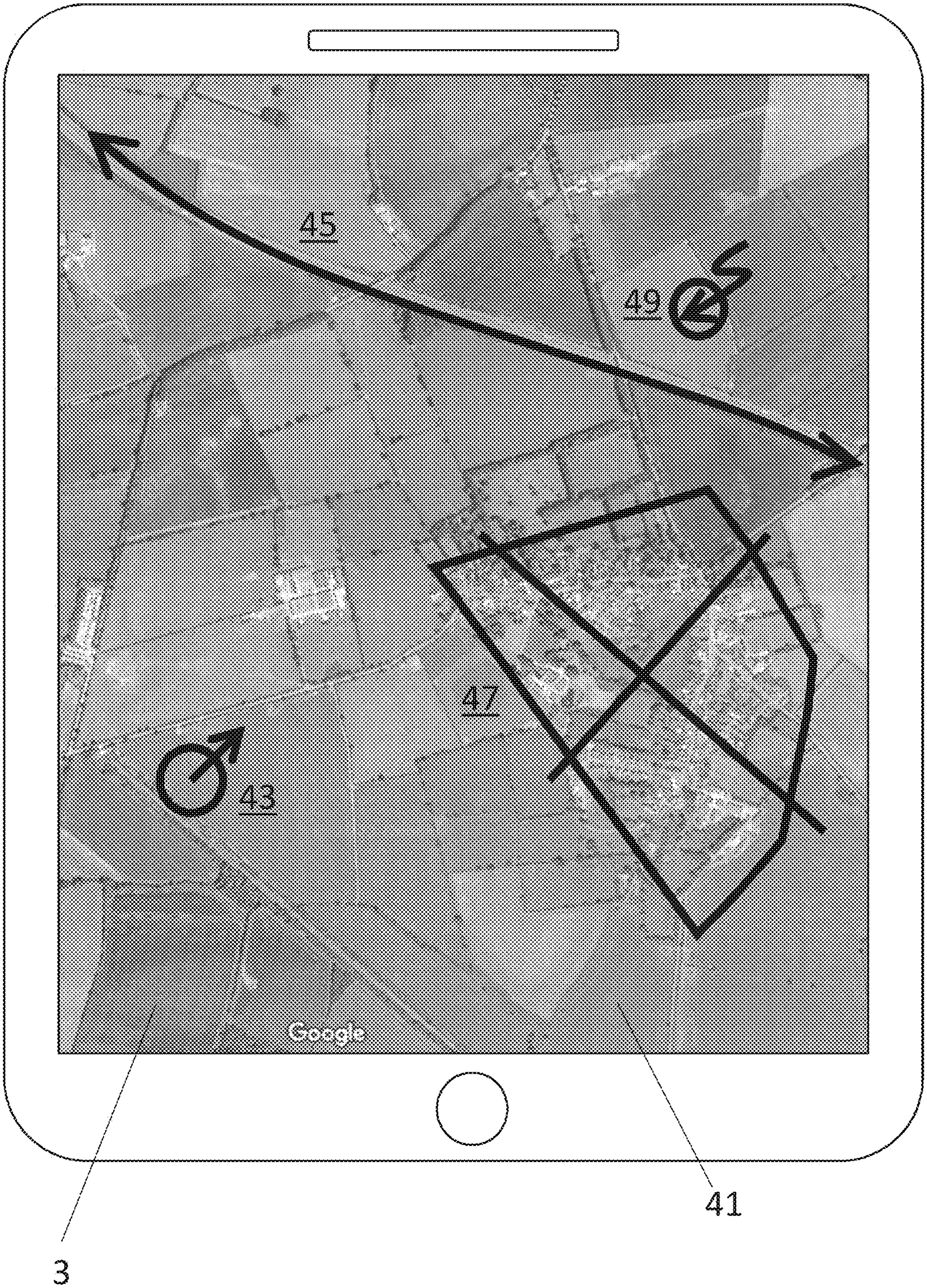
FIG. 9 illustrates a graphical user interface on which a set of graphical inputs have been drawn.

FIG. 9 illustrates an example of a set of graphical inputs provided on a map 41 displayed on a graphical user interface 3. Input 43 corresponds to the symbol of FIG. 4*a*, and is an instruction for the unmanned asset 15 to take off from the location where input 43 is drawn. Input 45 corresponds to the symbol of FIG. 6*b* and is an instruction for the unmanned asset 15 to patrol the portion of highway over which the line of input 45 is drawn. Input 47 corresponds to the representation of FIG. 6*d*, and is an instruction for the unmanned asset 15 to avoid flying over the area which is covered by the drawn polygon.

It can be seen from FIG. 9, that in the present case, the unmanned asset 15 is being instructed not to fly over the built-up area. Input 49 corresponds to the symbol of FIG. 4*c*, and is an instruction for the unmanned asset 15 to ditch in the location where input 49 is drawn in the case of an emergency.

In the example of FIG. 9, the unmanned asset 15 is being instructed to continuously patrol the section of highway, and no explicit landing instruction has been given. Therefore, in the illustrated scenario, the journey plan generated by the calculation unit will be to take off from the location of input 43, proceed to the section of highway covered by input 43 (whilst avoiding the area covered by input 45), continuously scan the section of highway until the unmanned asset 15 runs out of charge/fuel, and then ditch in the location of input 49.

The example of FIG. 9 illustrates a set of graphical inputs that can be performed by a single unmanned asset 15. However, the vocabulary of graphical inputs may also contain symbols which correspond to instructions which apply simultaneously to a plurality of unmanned assets 15. Two such symbols are illustrated by FIGS. 10*a* and 10*b*.

Figure 10A:
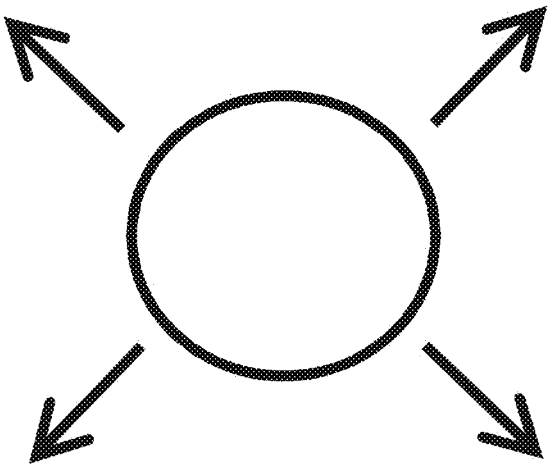
FIGS. 10*a* and 10*b* illustrate a plurality of symbols which may be accepted as graphical inputs.
Figure 10B:
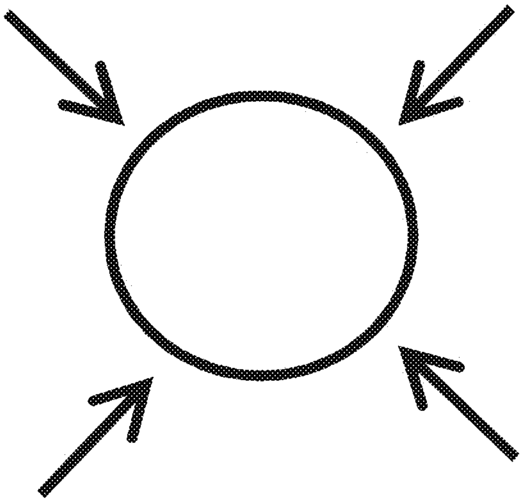

The symbol of FIG. 10*a* comprises a circle with four arrows which are equally spaced around the circle and point away from it. This symbol is used as an instruction to a cluster of unmanned assets 15 and is used to instruct the cluster of unmanned assets 15 to split up at the position on the map at which the symbol is drawn. The symbol of FIG. 10*b* comprises a circle with four arrows which are equally spaced around the circle and point towards the circle. This symbol is used to instruct the cluster of unmanned assets 15 to re-group at the position on the map at which the symbol is drawn.

Figure 11:
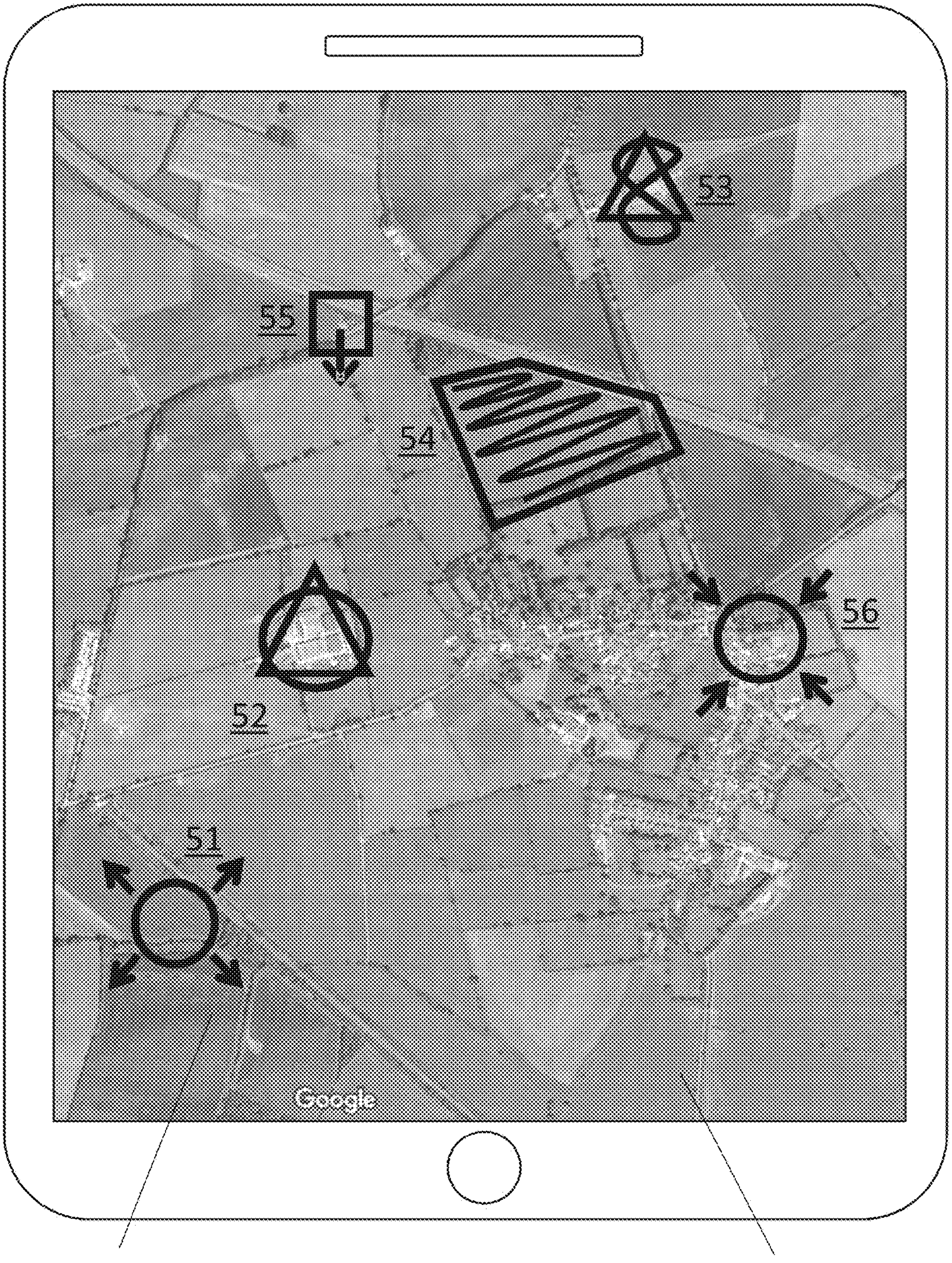
FIG. 11 illustrates a graphical user interface on which a further set of graphical inputs have been drawn.

FIG. 11 illustrates a further example set of graphical inputs provided on a map 41 displayed on a graphical user interface 3. The graphical inputs provided in FIG. 11 represent instructions for a cluster of unmanned assets 15.

Input 51 corresponds to the symbol of FIG. 10*a*, and is an instruction for the cluster of unmanned assets 15 to split up at the position on the map at which input 51 is drawn. Input 52 corresponds to the symbol of FIG. 7*b* and is an instruction for any unmanned asset 15 to monitor the point of interest at the location where input 52 has been drawn whilst flying in an orbit around the point of interest until interrupted by the commander. Input 53 corresponds to the symbol of FIG. 7*c* and is an instruction for any unmanned asset 15 to monitor the point of interest at the location where input 52 has been drawn whilst flying in a figure of eight around the point of interest until interrupted by the commander. Input 54 corresponds to the representation of FIG. 6*c* and is an instruction for any unmanned asset 15 to patrol the area covered by the zigzag filled shape. Input 55 corresponds to the symbol of FIG. 5*a* and is an instruction for a delivery unmanned asset 15 to deliver its payload at the location where input 55 is drawn. Input 56 corresponds to the symbol of FIG. 10*b*, and is an instruction to each of the unmanned assets 15 to re-group at the location where input 56 is drawn after they have completed their other operations.

In the case of the unmanned assets 15 assigned to perform the interruptible operations associated with inputs 52 and 53 they will continue to monitor the points of interest until the commander interrupts them, at which point they will move to the rendezvous point at the location of input 56. Meanwhile, the unmanned asset 15 assigned to deliver the payload at the location of input 55 will drop its payload, and then proceed directly to the rendezvous point. Likewise, the unmanned asset 15 assigned to perform the patrol according to input 54 will do so, and then proceed to the rendezvous point. Depending on the unmanned asset 15 position and status data, the calculation unit may determine that the same unmanned asset 15 should perform the tasks associated with inputs 55 and 54 since, as can be seen from FIG. 11, the unmanned asset 15 could deliver the payload, and then perform the patrol on its way to the rendezvous point.

Whilst the above described examples are primarily concerned with unmanned aerial vehicles (UAVs), the unmanned assets 15 being controlled could comprise any unmanned assets 15, e.g. unmanned ground vehicles (UGVs), unmanned surface vehicles (USVs) for operation on the surface of water, and unmanned underwater vehicles (UUVs). Further, the disclosed systems and methods could be applied to fleets of unmanned assets 15 comprising a plurality of different types of unmanned assets 15.

By way of example, in the example situation presented by FIG. 11, although the flying operations associated with inputs 52, 53, and 54 require a commander, the payload delivery instructed by input 55 could be performed by a UGV, and so a calculation unit 5 may simultaneously generate journey plans for a plurality of different unmanned asset types based on the same set of graphical inputs.

It will be understood that although the above examples are mainly focussed around the case of UAVs, the present disclosure is applicable to the control of many types of unmanned assets.

It will be seen that the system of the present disclosure has the potential to simplify the level of detail which needs to be input by an unmanned asset commander in order to effectively command one or more unmanned assets. As such, unmanned-manned teamwork can be more seamlessly provided, since the pilot or driver of a manned asset can command their unmanned teammates whilst still having the capacity to operate their own vehicle.

What is claimed is:

1. A system for controlling operation of one or more unmanned assets, the system comprising:

a graphical user interface displaying a map, wherein the graphical user interface is configured to accept one or more graphical inputs which are drawn on the map by an unmanned asset commander;

a calculation unit comprising:

an input interpretation module configured to:

recognize the graphical inputs based on their respective shapes;

determine at least one geographical location corresponding to a position on the map at which the one or more graphical inputs are drawn; and translate the graphical inputs into tasks and/or commands by comparing the respective shapes to a library of known input symbols and their corresponding commands associated with the respective shapes to be performed at the at least one geographical location, wherein each shape includes a first component configured to indicate an operating category of the one or more unmanned assets, and a second component configured to indicate the respective task and/or command, wherein the second component is spatially related to the first component in a manner representative of a relationship between the operating category and the respective task and/or command;

an operation planning module configured to:

generate operation instructions for one or more of the unmanned assets based at least on the tasks and/or; and a journey planning module configured to:

generate a journey plan for one or more of the unmanned assets based at least on the operation instructions; and a communications module configured to communicate with the one or more unmanned assets to instruct the unmanned assets to operate according to the generated journey plan.

2. The system according to claim 1, wherein the operation planning module is configured to:

obtain data indicative of external and/or environmental constraints; and generate operation instructions based on the data indicative of external and/or environmental constraints.

3. The system according to claim 2, wherein the data indicative of external and/or environmental constraints comprises data indicative of one or more of: terrain information, weather, obstacles, air traffic, restricted and hazardous areas, published navigation information.

4. The system according to claim 1, wherein the graphical user interface is configured to accept hand-drawn inputs.

5. The system according to claim 1, wherein the system is for controlling operation of one or more unmanned assets including one or more unmanned aerial vehicles (UAVs).

6. The system according to claim 1, wherein the system is for controlling operation of a plurality of unmanned assets comprising a plurality of different unmanned asset types.

7. The system according to claim 1, wherein the input interpretation module comprises a local memory, wherein the library of known input symbols and corresponding commands is stored in the local memory, or wherein the library of known input symbols and corresponding commands is stored in a remote memory, and the input interpretation module is configured to:

obtain the library of known input symbols and corresponding commands from the remote memory.

8. The system according to claim 1, wherein the operation planning module is configured to:

receive position and/or status data from the one or more unmanned assets.

9. The system according to claim 1, wherein the operation planning module is configured to:

allocate tasks associated with graphical inputs to different ones of a plurality of unmanned assets.

10. The system according to claim 9, wherein the operation planning module is configured to:

receive position and/or status data from the one or more unmanned assets; and wherein the allocation of tasks is based at least partially on the position and/or status data.

11. The system according to claim 1, wherein the graphical inputs correspond to commands including one or more of: take off from a location; land at a location; ditch at a location in case of emergency; rendezvous at a location at a time; deliver a payload to a location; pick up a payload from a location; inspect, one time, a portion of a highway, border, railway, or powerline; patrol, multiple times, a portion of a highway, border, railway, or powerline from a location; patrol or scan an area; avoid flying over an area; loiter at a location; monitor a point of interest in an orbit; monitor a point of interest in a figure-of-eight pattern; search an area for targets; search along a border for targets; gather at a location; and split from a location.

12. The system according to claim 1, further comprising: one or more unmanned assets.

13. A method for controlling operation of one or more unmanned assets, the method comprising:

displaying a map on a graphical user interface;

accepting, via the graphical user interface, one or more graphical inputs which are drawn on the map by an unmanned asset commander;

recognizing the graphical inputs by their respective shapes;

determining at least one geographical location corresponding to a position on the map at which the one or more graphical inputs are drawn;

translating the graphical inputs into tasks and/or commands by comparing the respective shapes to a library of known input symbols and their corresponding commands associated with the respective shapes to be performed at the at least one geographical location, wherein each shape includes a first component configured to indicate an operating category of the one or more unmanned assets and a second component configured to indicate the respective task and/or command, wherein the second component is spatially related to the first component in a manner representative of a relationship between the operating category and the respective task and/or command;

generating operation instructions for one or more of the unmanned assets based at least on the tasks and/or commands;

generating a journey plan for one or more of the unmanned assets based at least on the operation instructions; and communicating with the one or more unmanned assets to instruct the unmanned assets to operate according to the generated journey plan(s).

* * * * *